United States Patent [19]

Trost et al.

[11] 4,346,993
[45] Aug. 31, 1982

[54] PULL-THROUGH STRUCTURE FOR MEASURING THE CURVATURE OF THE INTERNAL WALL OF A PIPE OR TUBE

[75] Inventors: Elmar Trost, Ratingen; Rudolf Reusch, Duesseldorf, both of Fed. Rep. of Germany

[73] Assignee: Rheinmetall GmbH, Duesseldorf, Fed. Rep. of Germany

[21] Appl. No.: 201,330

[22] Filed: Oct. 27, 1980

[30] Foreign Application Priority Data

Nov. 9, 1979 [DE] Fed. Rep. of Germany ....... 2945290

[51] Int. Cl.³ .............................................. G01C 9/06
[52] U.S. Cl. ................................... 356/138; 356/250; 356/241; 33/295
[58] Field of Search ................ 356/138, 153, 154, 241, 356/250, 372, 399, 400, 401; 350/16, 23; 250/236; 33/286, 295

[56] References Cited

U.S. PATENT DOCUMENTS

| | | | |
|---|---|---|---|
| 3,634,941 | 1/1972 | Roodvoets et al. | 33/295 |
| 3,703,682 | 11/1972 | Wickman et al. | 356/153 |
| 3,723,013 | 3/1973 | Stirland et al. | 356/400 |
| 3,907,435 | 9/1975 | Roodvoets | 356/153 |
| 4,095,347 | 6/1978 | Stoffan | 33/234 |
| 4,199,258 | 4/1980 | Dau | 356/241 |

*Primary Examiner*—R. A. Rosenberger

[57] ABSTRACT

A pull-through structure for measuring the flexure of a pipe or tube such as, for example, a gun barrel. The pull-through structure includes a laser beam detector which is freely swingably mounted in a casing forming part of the pull-through structure. The arrangement is adapted to coact with a laser beam emitter which is adapted to emit a laser beam substantially axially through the gun barrel. The laser beam detector includes a dead weight which causes an active detection surface thereof to automatically assume a predetermined angular position in the casing.

10 Claims, 3 Drawing Figures

PULL-THROUGH STRUCTURE FOR MEASURING THE CURVATURE OF THE INTERNAL WALL OF A PIPE OR TUBE

BACKGROUND OF THE INVENTION

The invention relates to a pull-through member for measuring the extent of bending the interior wall surfaces of a pipe or tube, consisting of a housing which is centrally mounted in the interior of the pipe or tube and which is longitudinally axially slidably displaceable, and is also provided with measuring means.

With such known pull-through members the inner space of the casing or housing, which may be cylindrical, is occupied by a collimator, which has cross hairs at both of its ends. The collimator coacts with a sighting scope, mounted outside of the pipe or tube, which is being measured, the optical lense of which is also equipped with cross hairs which is brought in coincidence with the cross hairs of the collimator after each stepwise advance of the cylindrical housing in the pipe or tube. After the housing and thereby the collimator has been slidably advanced in the pipe or tube, the cross hairs of the collimator can indicate deviations from the sight line. Depending on the magnitude of these deviations a measuring value can be read off from the scale included in the cross hair arrangement of the sighting scope.

Such an arrangement is, for example, disclosed in German published patent application No. 2352240, wherein a pullthrough structure is described. In such an arrangement only a cumbersome and complex sequential determination of individual values is possible; a substantial number of errors are introduced in the measurement in view of the fact that the tube or pipe has to be aligned prior to the measurement; all of which is due to the fact that the housing or casing has a tendency of being turned while it is being pulled through the pipe. Known measuring processes are therefore impractical because of the excessively long time it takes to complete the process and the poor measuring results obtained thereby.

SUMMARY OF THE INVENTION

It is a general object of this invention to provide a pull-through structure that permits the utilization of linear measuring systems which are well known in the mechanical engineering field, in particular by using the new laser technology when applying this technology to the specific requirements of pipe measurements. In the laser linear measurement process a laser beam is used as a reference line and deviations relative to the laser beam are detected with the aid of a laser beam position detector, for example, a photo-diode. As a result of the signals being emitted by the detector an evaluation unit furnishes two measuring values, which indicate the deviations in directions normal to the beam. The determination of the misalignment can be calculated in a computer. The measuring process and the arrangement of the relevant components is described in the research report No. 2719 of the State of North-Rhein Westphalia, compiled by T. Pfeiffer and C. A. Schneider, publisher West-German edition Opladen 1978.

Known types pull-through structures are not suitable for this new measuring process because they lack a beam position detector as measuring means and because it is not possible to maintain the measuring means parallel during advance in the horizontal and vertical planes.

It is therefore an object of this invention to provide a pull-through structure which is in a position to accommodate a beam position detector and with which the slidable displacement of the pull-through body in the to be measured pipe is automatically maintaining the electrical axes of the beam position detector parallel with the horizontal and vertical measuring planes. This facilitates the rapid and simple handling of the arrangement and the avoidance of measuring errors. It also permits the enlargement of the measuring ranges and the automatization of data acquisition for the measuring process and the evaluation thereof with the aid of a computer.

The solution afforded by the arrangement of the invention resides in that in the afore-described pull-through body the housing thereof contains as measuring means a beam position detector, for example a photo diode, which receives the light rays of a laser beam, and which is freely swingably mounted about the housing body axis and therefore also the axis of the pipe to be measured, and is maintained in its pivotal position by means of a weight eccentrically connected to it. Thereby the intersection of the axes of the detector remains at all times perpendicular and horizontal respectively and thereby parallel to the measuring plane, while the detector invariably swingably resumes the same position, even if the housing body rotates when advancing through the pipe. This "hunting" of the correct position is effected in a short period of time ranging from 1 to 4 seconds, so that the measurements can be quickly carried out in rapid succession.

The constructional form of the pull-through body can be such that the detector is arranged in a container, which is rotatable on ball bearings mounted in the body housing and to one side of which the weight is secured. Selected ball bearings with small frictional resistance permits this self-alignment to take place.

In order to facilitate this the ball bearings are lubricated with a light oil. In order to keep the pull-through structure small so that it can be introduced into pipes having reduced diameters, it is advantageous to use as receiving container an offset cylindrical pipe, in the narrower portion of which the detector is accommodated. The ball bearings are spaced a certain distance from each other, and surround the outer periphery of this offset narrower portion. It is thus possible, by using the very small ball bearings available on the market, to produce a pull-through structure of less than 5 cm in diameter. An active detector surface of 3 cm in diameter then suffices as an active receiving detector surface. The laser beam has a thickness of about 1 cm and during measuring there appear deviations upwardly or downwardly or laterally of no more than 1 cm.

The simple method provided by the invention for building the container into the casing is effected by means of a spacer pipe which maintains the ball bearing rings at a predetermined distance from each other and by means of a securing ring having an external threaded portion mounted in the inner wall of the body housing and, on the other hand, by means of an interiorally threaded ring nut mounted on the exterior walls of the receiving housing.

In order to maintain the detector insulated from the metal portions of the assembly, the invention provides an inner pipe which can be slid into the inner housing via an insulating disc and an insulating ring.

To enable the outer ends of the pipes to be measured likewise, the laser beam detector is centrally situated in such a way that its active surface, forming the measuring plane, is situated in the plane of the median connecting lines of ring gages on that side of the casing which is more remote from the laser beam. Since the to be measured pipe has a very narrow diameter tolerance, with respect to the deviations from straightness, the central guidance of the housing body can be simply effected by means of adjusting rings which are mounted as ring gages on the outer periphery of the housing body in lieu of a complex spreading arrangement. By simply exchanging the adjusting rings, the pull-through body can be adapted to the diameter of the pipe to be measured.

A space-saving accommodation of the dead weight results from its arrangement between the roller bearing rings. In order to protect the roller bearings from dust contamination, there is provided, in accordance with the invention a protective filter which is non-opaque with respect to the laser beam, for example, it is made out of glass, and is mounted on the face of the body housing which faces the laser beam.

For connecting the detector with the evaluation unit, there is provided an aperture for the connecting lines of the detector, while for the displacement the pull-through body in the to be measured pipe, there is provided a further aperture for the connection of a positioning bar in that end face of the housing which faces away from the laser beam. Since for the measuring process a swing of the detector by a maximum angle of 40° to both sides is required, the pivoting range of the dead weight piece by means of stops mounted on the interior wall of the housing can be correspondingly limited. This prevents the connecting lines for the detector from being rotated out of place.

BRIEF DESCRIPTION OF THE DRAWING

These and other objects of the present invention are realized and illustrated in the preferred embodiment shown in the accompanying drawing in which.

DETAILED DESCRIPTION

Figure 1:
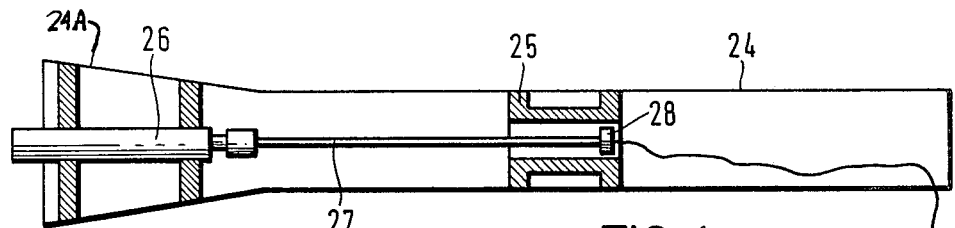
FIG. 1 is a schematic side elevation, partially in cross section, of the measuring arrangement including the pull-through structure disposed in a pipe.

In accordance with FIG. 1 there is disposed in a pipe, for example, a gun barrel in which the flexure or bending is to measured caused by manufacturing malfunction (curverture) and due to sag causing bending of the pipe. There is mounted a pull-through structure 25 with a laser beam position detector 28 which is irradiated by the laser beam 27 of the laser beam emitter 26. The laser beam emitter 26 is centrally mounted in a conical portion 24A adjoining the pipe 24 in such a way that the laser beam 27 coincides exactly with the pipe axis. In the case of a gun barrel 24 the conical portion 24A can be the loading space or chamber of the gun, so that the measurements can be carried out without dismantling the gun barrel from the gun carriage (not illustrated). The connecting lines 21 lead from the beam position detector 28 to an evaluation unit 30, in which the deviations dY and dZ, in a vertical and horizontal direction are indicated respectively, during the pulling through of the pull-through structure 25 through the pipe 24 with the aid of a measuring program in the computer thereby calculating the bending or flexure of the pipe.

Figure 2:
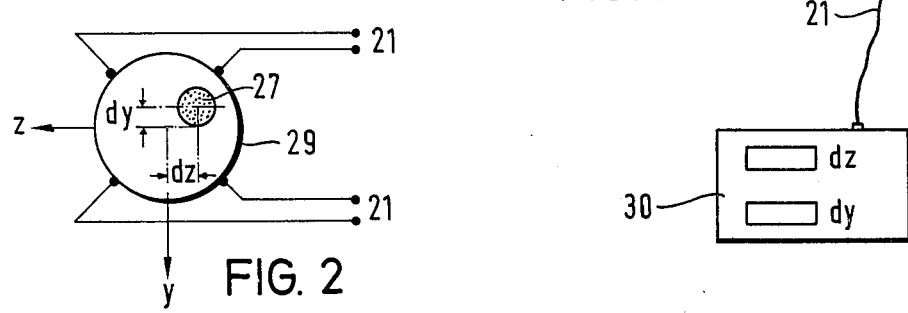
FIG. 2 is a cross section, in an enlarged scale, through the measuring plane of the detector

FIG. 2 illustrates, how a particular measuring position of the laser beam 27 has deviated from the center of the system of coordinates YZ by the distance dY and dZ on the measuring plane 29.

Figure 3:
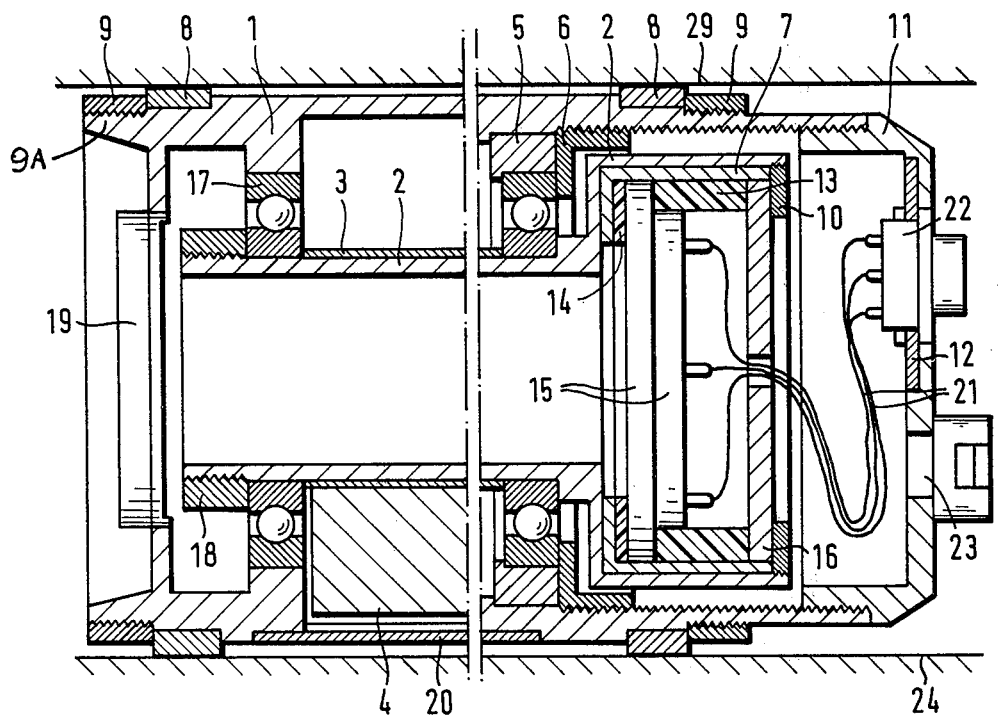
FIG. 3 illustrates in a still larger scale, a longitudinal section through the pull-through structure.

FIG. 3 illustrates the housing body 1 of the pull-through structure mounted in the to be measured pipe 24 via adapting or gage rings 8. The adapting rings 8 are held against shoulders by means of interiorially threaded holding rings 9 which are screwed onto an exteriorly threaded portion 9A of the housing body 1 and can therefore be easily exchanged. In the housing body 1 the receiving casing 2 for the detector 15 is rotatably mounted via the roller bearings 17. The roller bearings 17 are held at a predetermined distance by means of the space ring 3. The left roller bearing 17 is held on the receiving housing 2 by means of a ring nut 18 bearing against its free end. The right roller bearing 17 is connected by means of an intermediate ring 5 with the housing body wall and is held in position in the body housing 1 by means of the exteriorly threaded holding ring 6. The dead weight piece 4 is shown in FIG. 3 as mounted between the roller bearings 17. The storage space for dead weight piece 4 is accessible via a cover 20 removably mounted in the housing body 1. The beam position detector 15 is mounted in the right end region of the housing body and is fixed in a container formed by an interior pipe 7 being provided with a pipe cover 16, wherein it is held by means of the insulating disc 14 and the insulating ring 13, so that it can not come into contact with the walls of the housing 7, 16. This housing 7, 16 is slid into a further portion of the receiving casing 2 and is held therein by means of the ring screw 10 threadably held therein. The measuring plane 29 is on a level with the middle of the right-hand gage ring 8. On the right side of the detector 15 there are disposed connecting lines 21 which lead through the aperture 22 to the evaluation unit 30. The cap 11, forming the right face wall of the housing body, contains an opening 23 for mounting a positioning rod (not illustrated) which serves to slidably pull the pull-through structure through the tube or pipe to be measured. Furthermore, it is possible by means of a disc 12 to affix on the cap 11 a socket for a plug socket connection for the connecting lines 21. A protective filter 19 which permits the passage therethrough of the laser beam, is mounted in front of the aperture of the lefthand face of the housing body 1.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A pull-through structure for measuring the flexure of the inner wall of a pipe or tube, by means of a laser beam emanating from a laser beam emitter and substantially axially passing through said pipe or tube comprising in combination, a casing coaxially mounted in said pipe or tube and adapted to be slidably axially pulled therethrough, measuring means operatively mounted in said casing and adapted to measure the flexure of said pipe or tube at the position of said casing therein, said measuring means comprising a laser beam detector freely swingably mounted in said casing about the axis of the casing and thereby about the axis of the pipe or tube to be measured, said laser beam detector having a dead weight eccentrically fixed thereto which maintains said laser beam detector in a predetermined angular position in said casing.

2. The pull-through structure as defined in claim 1, wherein said laser beam detector includes a photodiode.

3. The pull-through structure as defined in claim 2, wherein said laser beam detector is mounted in a housing, roller bearing means coaxially mounted in said casing and coaxially freely swingably supporting said housing therein, said dead weight being fixed to said housing.

4. The pull-through structure as defined in claim 3, wherein said housing is an offset pipe having a first section of reduced diameter and a second section of larger diameter than said first section, said laser beam detector being mounted in said second section of said offset pipe, said roller bearing means being mounted on said first section of said offset pipe.

5. The pull-through structure as defined in claim 4, including a spacer ring coaxially mounted on said first section of said offset pipe, said roller bearing means comprising a pair of roller bearings, said spacer ring being disposed therebetween, first and second holding rings being respectively threadably mounted on said first section of said offset pipe and inside said casing to secure said pair of roller bearings in position on said first section of said offset pipe.

6. The pull-through structure as defined in claim 4, including a cylindrical pipe member coaxially supporting said laser beam detector, said cylindrical pipe member being coaxially supported in said second section of said offset pipe, and insulating rings mounted inside said cylindrical pipe member to support said laser beam detector therein in electric insulation therefrom.

7. The pull-through structure as defined in claim 6, a pair of rubber rings mounted inside said pipe or tube and adapted to coaxially support said casing therein, said laser beam detector having an active detection surface which coincides with a plane normally passing through the middle of the caliber ring of the pair of caliber rings which is most remote from the laser beam emitter.

8. The pull-through structure as defined in claim 7, wherein said dead weight is affixed to said first section of said offset pipe and is disposed between said pair of roller bearings.

9. The pull-through structure as defined in claim 8, including a protective filter coaxially mounted on the casing at the end thereof confronting the laser beam emitter.

10. The pull-through structure as defined in claim 9, wherein said casing has an end wall at the end remote from said laser beam emitter, said end wall having a first aperture, an evaluation unit disposed outside said pipe or tube, and electrical conduit means extending therethrough and being electrically conductively connected to the laser beam detector at one of its ends and to the evaluation unit at the other one of its ends, said end wall having a second aperture through which a positioning rod is adapted to extend for moving said casing through the pipe or tube.

* * * * *